Nov. 15, 1966 R. J. RASMUSSEN 3,285,377
TORQUE RELEASED ONE WAY BRAKE
Filed Feb. 20, 1964 3 Sheets-Sheet 1
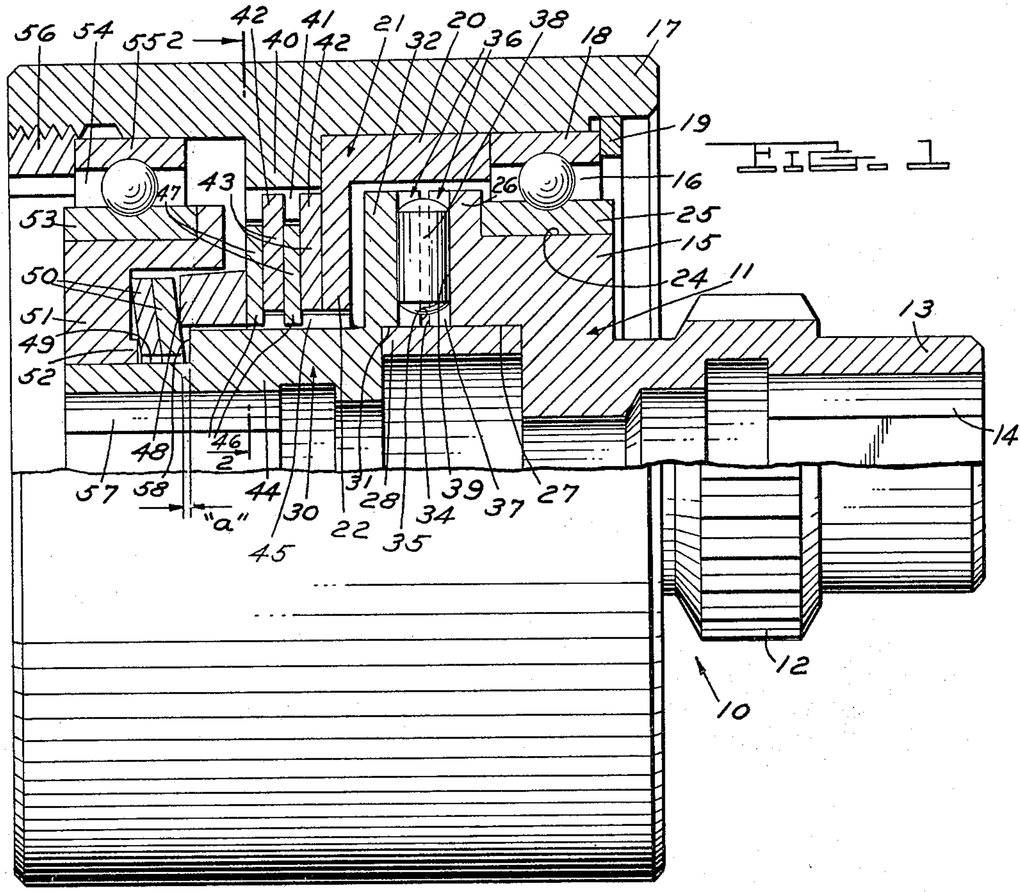
FIG. 1
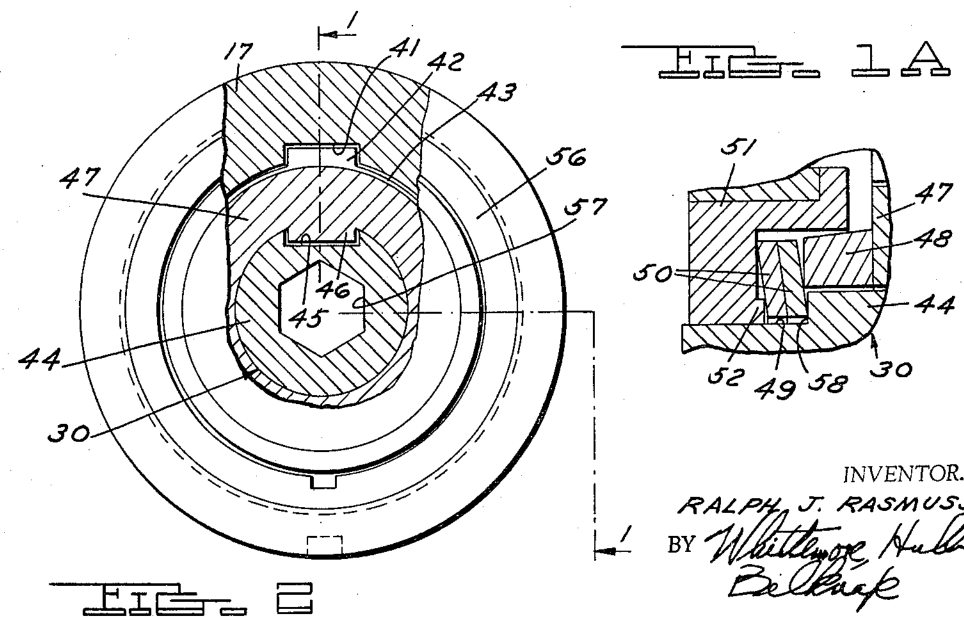
FIG. 1A
FIG. 2
INVENTOR.
RALPH J. RASMUSSEN
BY Whittemore, Hulbert & Belknap
ATTORNEYS TORQUE RELEASED ONE WAY BRAKE
Filed Feb. 20, 1964
3 Sheets-Sheet 2
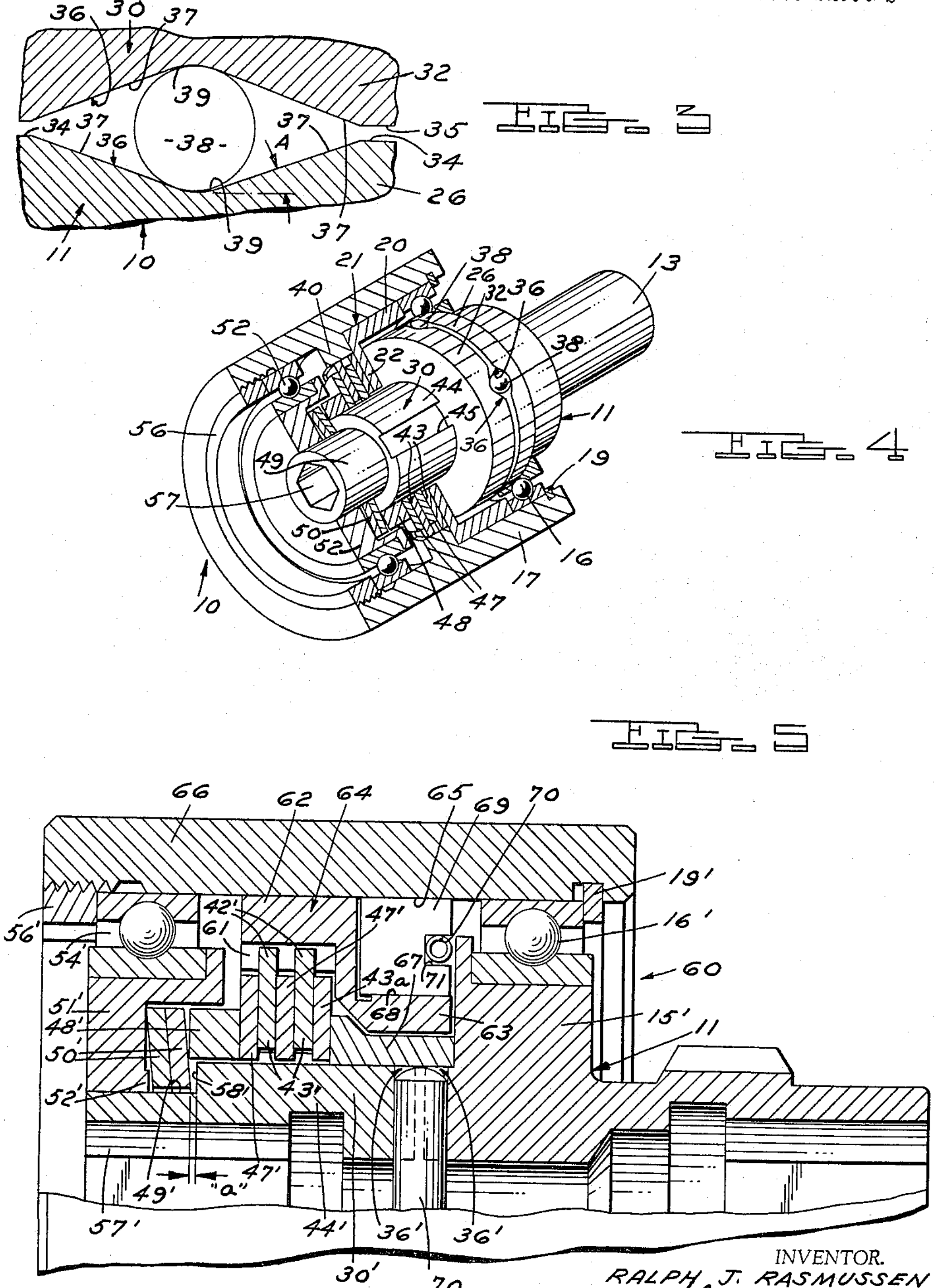
INVENTOR.
RALPH J. RASMUSSEN
BY Whittemore, Hulbert & Belknap
ATTORNEYS Nov. 15, 1966 R. J. RASMUSSEN 3,285,377
TORQUE RELEASED ONE WAY BRAKE
Filed Feb. 20, 1964 3 Sheets-Sheet 3
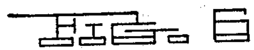
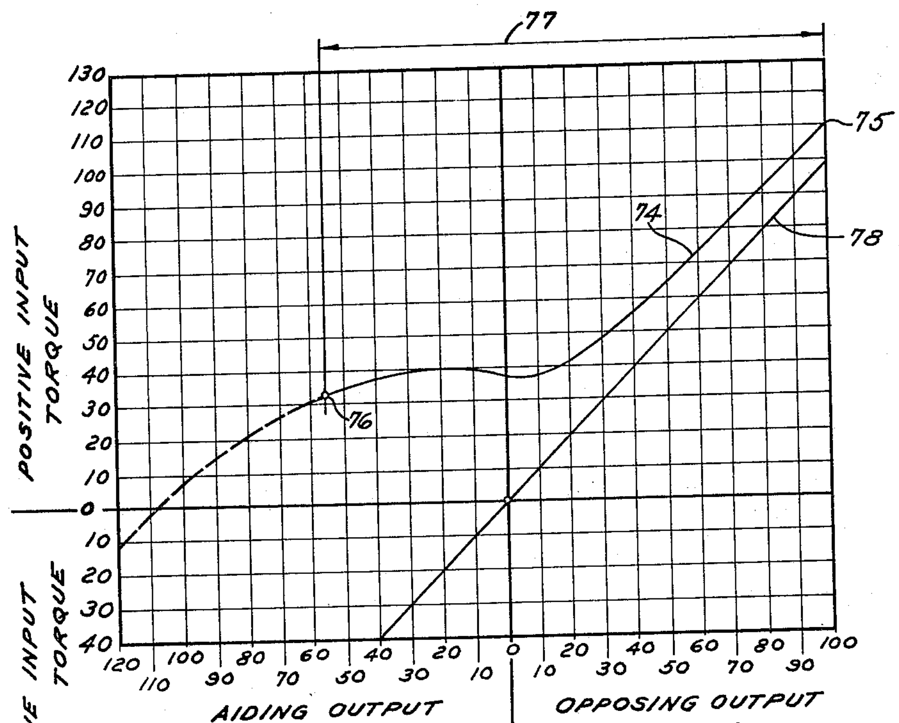
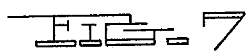
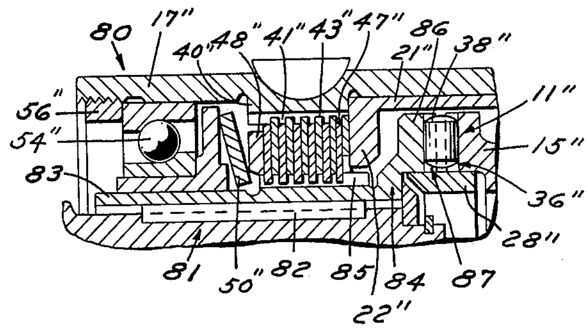
INVENTOR
RALPH J. RASMUSSEN
BY Whittemore, Hulbert & Belknap
ATTORNEYS United States Patent Office 3,285,377

Patented Nov. 15, 1966

3,285,377

TORQUE RELEASED ONE WAY BRAKE

Ralph J. Rasmussen, New Baltimore, Mich., assignor to Formsprag Company, Warren, Mich., a corporation of Michigan Filed Feb. 20, 1964, Ser. No. 346,176
2 Claims. (Cl. 192—8)

The present invention relates to improvements in an automatically releasable load brake embodied in a power transmitting unit and having an improved action in braking and bringing to a halt a power output member driven by a coaxial power input member, in the event a load torque on the output member exceeds a predetermined critical value in a direction causing the same to overrun the input member. More particularly, the invention affords means by which the braking and limiting action on the overrunning or so-called aiding torque is performed with high efficiency in regard to the absorption and dissipation of frictional braking energy, and by which a device operated by the output member is in the normal instance of an output torque opposing input torque, driven at practically full input power until the load torque changes from a resistive one to an aiding or assisting one of predetermined critical value. At this time the brake provisions of the invention automatically come into play. The power input may be rotatively bi-directional or uni-directional, as represented by the respective alternative embodiments herein shown and described.

A torque transmitting and load limiting brake unit of this character has many applications, particularly in which it is necessary or desirable to accomplish the overrun-halting action in a way to absorb and dissipate the energy of braking in an efficient and shock-free manner, i.e., with the applied braking force distributed over a large braking area and at low unit braking pressure.

For example, the unit may be employed in the operation of a ball nut and screw device wherein it is desirable to govern the torque applied to an output member, such as the screw of such device, in an application in which the device is employed to lift and lower a load, as when the gravitational or other lowering force tries to rotatively over-shift the screw in relation to a coacting drive nut powering both the lifting and the lowering effort. Such an application is a typical instance of a torque condition representing an aiding or assisting load which it may be desirable to control to an acceptable torque value.

Another application of the improved brake unit might be between the motor and the driver of a chain conveyor having a combination of up and down flights, the brake unit thus acting to govern excessive aiding load on the conveyor. Still another instance of utility is in the control of the positioning of an aircraft elevator or flap, in which either gravity, inertia and air stream-produced loads might give rise to an excessive aiding torque requiring limitation by the braking action of the improved unit.

The improved load brake is distinguished in these aspects of govering or limiting aiding load torque from known types of anti-feedback torque mechanisms, in which an output member is prevented from transmitting opposing torque back to an input member. Moreover, the improved unit or device has the great advantage referred to above that the output member will be effectively and smoothly though rapidly braked in a desired energy-dissipating manner to the acceptable input torque value.

It is an object of the invention to provide an improved overrun-limiting mechanism of the type described wherein a roller and ramp type of sub-assembly is employed to directly transmit a driving torque from an input member to an output member, this sub-assembly acting conjointly with a spring and brake disc sub-assembly in the function of limiting torque as described above. The last named subassembly is operated to brake, hold or release the output member in accordance with the relative axial positions of the input and output members.

Thus the power input member normally operates (in one or the other of two rotative directions in the case of the bi-directional embodiment) against the resistance of the loaded output member, and until the resistance becomes an excessive aid or assistance in the input drive direction, the roller and ramp sub-assembly, through which normal driving torque is transmitted, causes the output member to be variably positioned away from the input member, depending on the value of the resistive load torque. However, when load torque changes direction to a pre-set critical degree, the excess aiding torque causes a relative rotation of the coaxial power input and output members, thus resulting in a relative rotative displacement of their parts at the roller and ramp sub-assembly. Thereupon, a relative spring-biased axial shift of those members (more specifically, an axial shift of the output member toward the input member) takes place, which shift is effective to frictionally engage a disc set or pack of the spring and brake disc subassembly, with resultant braking of the output member, until the overhauling trend halts. The brake disc pack then disengages and releases, and the input member resumes drive of the output through the agency of the roller and ramp sub-assembly.

Another object of the invention is to provide an improved torque transmitting and load brake unit having the referred-to highly desirable energy absorptive quality of a multiple flat disc pack, in which the latter is urged to frictional braking engagement of the discs thereof by Belleville type spring means coaxial with the brake discs, which spring means and discs coaxially encircle the braked output member.

A further object of the invention is to provide an improved, automatically releasable load brake which, in a bi-directional torque input embodiment thereof, has alternate discs of its disc pack component keyed directly and non-rotatively, though free for slight axial shift, to a fixed cylindrical braking member or ground drum. These discs and other coacting discs keyed to the power output member are compressed under excessive load torque by the Belleville spring means. In another, uni-directional embodiment of the brake of the invention, the roller-ramp and spring-disc sub-assemblies are similar, but braking and locking in relation to the fixed or drum or ground member is performed through the intermediate agency of a set of drum-gripping sprags.

Specifically in accordance with the invention, the design of the roller and ramp sub-assembly is an improved one, in that recessed ramp formations on facing surfaces of the respective power input and output members are each designed to provide straight inclined ramp surfaces converging at a given obtuse angle toward a common arcuate central zone between said convergent surfaces, at which zone a roller bottoms when the load brake is in a neutral condition; and in that the radius of curvature of such bottoming zone is greater than that of the roller as the zone merges on its opposite ends with the inclined convergent ramp surfaces.

Thus as the opposed input and output ramp formations shifts circumferentially relative to one another when drive commences, the roller rides up toward one or the other of the ramp surfaces along a relatively mild surface curvature, prior to going onto the inclined straight ramp surface proper, which is at a substantially more acute inclination than the bottom curvature. Consequently the roller reacts with the ramp formations under a substantially increased mechanical advantage, in initially thrusting the output member axially away from the input member and prior to rolling onto the straight ramp surface, than it does later. Greatest axial force is exerted in this beginning phase to release the brake disc set or pack and transmit driving torque quickly, even in the presence of light output torque load.

While in the above text reference has been made to a relative axial motion of the input and output members occasioned by driving torque and the excessive overhaul by the output load, the invention also contemplates an arrangement in which no such relative axial shift of output and input members takes place. In accordance with such an alternative embodiment, as herein shown, the output or rotatively and axially movable member has a splined driving connection to the output member which will permit an axially fixed positioning thereof in the mechanism, with the spline-connected ramp member capable of the necessary axial shift in driving and overrunning, yet still maintaining a torque transmitting connection to the output member and to the brake sub-assembly, to which the special output ramp member also has a keyed torque transmitting connection.

Generally, it is an object of the invention to provide a torque transmitting and load brake mechanism of the sort described which has a very desirable performance characteristic in either the load-opposed or load-aided phase of its operation, as hereinafter explained.

The foregoing as well as other objects will become more apparent as this description proceeds, especially when considered in connection with the accompanying drawings illustrating the invention, wherein:

FIG. 1 is an enlarged scale view of a bi-directional power input embodiment of the improved torque transmitting brake unit of the invention, being partially broken away and in section on an axially extending radial plane along line 1—1 of FIG. 2, this view showing the unit in an engaged or brake condition;

FIG. 1A is a fragmentary view in section similar to FIG. 1, but showing the unit in a disengaged or brake-released and torque transmitting condition of its parts;

FIG. 2 is an end elevational view, as from the left of FIG. 1, being partially broken away and in transverse radial section along line 2—2 of FIG. 1;

FIG. 3 is a fragmentary enlarged scale sectional view showing an improved design of the roller and ramp sub-assembly of the unit;

FIG. 4 is a perspective view of the embodiment of FIGS. 1A and 2, certain components thereof being sectioned in a radial plane through the axis of the unit;

FIG. 5 is an enlarged scale view in section similar to FIG. 1, illustrating an alternative, unidirectional power input embodiment of the unit;

FIG. 6 is a graph showing typical performance curve features of the bi-directional embodiment of FIGS. 1–4 of the invention; and FIG. 7 is a fragmentary view in section similar to FIGS. 1 and 5, showing an alternative embodiment of the invention in which the actual input and output torque members maintain a fixed axial relation to one another in all phases of operation.

Referring to FIGS. 1–4, the bi-directional torque-transmitting brake unit of the invention, generally designated 10, comprises a power input member, generally designated 11, which is provided with means for rotating the same in either angular direction, such means being illustrated in FIG. 1 of the drawings as a spur gear 12 formed integral with a tubular outer drive extension 13 of input member 11. Of course, such bi-directional drive means might be of various other types, i.e., worm gear, sprocket and the like; and as an alternative, or in addition, the extension 13 may be provided with an internal hexagon-shaped bore 14 to receive a further driving member (not shown).

Power input member 11 is provided with an enlarged cylindrical body portion 15, at which it is journalled by means of a ball bearing 16 within one end of a fixed outer brake drum or ground member 17, the outer race 18 of bearing 16 being axially restrained from the right (FIG. 1), as by a snap ring 19 engaged within an end counterbore of brake drum 17. The axial inner face of the outer bearing race 18 is abutted by an annular horizontal flange 20 of an annular brake abutment member or ring 21 of L-shaped cross section, this member presenting a radially extending brake disc abutment flange 22.

The enlarged cylindrical body portion 15 of power input member is shouldered at 24 to receive the inner race 25 of ball bearing 16, which race axially inwardly abuts an integral, radially outwardly projecting, circumferential ramp flange 26 on the body portion 15. In addition, the latter is axially inwardly counterbored at 27 to receive an annular roller restraining ring 28, for a purpose to be described.

The reference numeral 30 generally designates a power output member of the subject torque-transmitting brake unit 10, output member 30 being coaxial with and in axially spaced relation to the power input member 11. At its right-hand end (FIG. 1), the member 30, is counterbored at 31 to receive the roller restraining ring 28 between the members 11 and 30; and radially outwardly of the counterbore 31 and the power output member 30 is formed to provide an integral, radially outwardly extending, circumferential ramp flange 32, which is outwardly coextensive with the flange 26 on power input member 11. The input and output member flanges 26, 32 have substantial clearance radially inwardly of the axial flange 20 of the brake disc abutment ring 21.

As shown in Figs. 1, 3 and 4, these radial flanges have mutually facing, radially extending annular faces 34, 35, respectively, and each of these faces is formed to provide a number, for example four, of wedging ramp formations or recesses 36 which are equally spaced circumferentially thereabout. Each formation 36 of the respective surfaces 34, 35 presents a pair of straight, inclined wedge or ramp surfaces 37, which surfaces converge toward one another, as shown best in FIG. 3, at an angle A of 20° to a transverse radial plane between the spaced flange surfaces 34, 35.

The ramps 36 of the respective input and output members 11, 30 are in circumferentially or angularly registered relationship to one another when the unit 10 is in the neutral and braked condition depicted in Figs. 1 and 3 of the drawings.

A cylindrical walled roller 38 is disposed between each pair of the circumferentially registered ramps 36, the elongated axis of this roller being disposed radially, as appears in FIG. 1, and being restrained as to its radial inward movement by the ring 28. These rollers are gripped axially between the flanges 26, 32 of input and output members 11, 30, under force exerted by a spring and brake disc sub-assembly to be described; and in the neutral, braked condition of the unit 10, each roller 38 bottoms between mildly arcuate central surfaces 39 of the respective input and output ramp formations or recesses 36, into which the straight inclined ramp surfaces 37 converge and tangentially merge, as shown in Fig. 3.

The bottom surfaces 39 are constructed on an arc of radius somewhat greater than that of the roller 38, as shown in Fig. 1, so that when input power torque is initially applied by member 11, the roller 38, in commencing to ride up upon the ramp-starting surface 39, is, because of its mild inclination as compared with the approximate 20° angle of the surface 37, capable of acting with the benefit of a greater mechanical advantage than it has when it is fully upon the ramp surface 37 proper. Accordingly, it exerts the maximum axial thrust at the commencement of torque transmission of unit 10, so as to disengage the brake structure (to be described), and place the unit in driving condition quickly, even in the presence of light output torque load. This feature of variable thrust exerted at the roller and ramp sub-assembly, due to the combination of arcuate and straight inclined ramp surfaces 39, 37, respectively, is considered to be a significant feature of the invention.

It will be appreciated from the description to this point that when the opposing wedging ramps 36 are exactly aligned circumferentially, in the neutral condition of Figs. 1 and 3, the space between the ramp flanges faces 34, 35 is at a minimum, and that the space increases as the rollers ride up the ramp surfaces to transmit whatever degree of driving torque to output member 30, when the latter is unbraked, that the unit 10 is designed for. As this takes place the output member 30 is wedged or cammed by rollers 38 to the left, as viewed in Fig. 1.

It will also be seen that, upon a forward overrun rotation of the member 30 in respect to the member 11, as when an excessive aiding load arises at the output, the rotation of the output member flange 32 reverses in respect to the flange 26, thus to cause the rollers 38 to roll back down on the wedging ramp surface 37, thus allowing the power output member 30 to return to the right toward input member 11. As this occurs, the member 30 is frictionally braked by means to be described, and braking continues so long as the excessive condition of overrun or aiding load obtains.

The restraining ring 28 prevents radial inward movement of torque transmitting rollers 38; while the annular flange 20 of brake abutment ring member 21 similarly restrains the rollers against radial outward movement.

Directly to the left (Fig. 1) of the L-sectioned disc abutment ring 21, the brake or ground drum 17 is formed to provide a radially inwardly extending, circumferential shoulder or flange 40, against which the ring 21 abuts at its left. Shoulder 40 is formed to provide one or more axially extending and radially inwardly opening, key grooves or recesses 41 engaged by mating key or spline-like lugs 42 projecting from each of a pair of axially spaced, flat brake friction discs 43. The right-hand inmost of these discs engages axially against the radial flange 22 of abutment ring 21.

Radially inwardly of these discs the power output member 30 is provided with a cylindrical body portion 44 which is formed with one or more axially extending and radially outwardly opening recesses 45, with which projecting lugs 46 of a further pair of brake friction discs 47 have keyed, non-rotative engagement.

A brake thrust or pressure ring 48 encircles the cylindrical body portion 44 of power output member 30. It abuttingly engages the left-hand brake disc 47 of the disc pack, and output member 30 is provided to the left (Fig. 1) of the body portion 44 with an external cylindrical surface 49 of reduced diameter, about which a mated pair of annular, frusto-conical Belleville springs 50 are disposed. These springs are adapted to have thrust transmitting engagement with the pressure ring 48 to urge the latter to the right, compressing brake discs 43, 47 and thereby locking the power output member 30 to the brake drum 17 of the unit 10, as shown in Fig. 1.

The Belleville springs 50, pressure ring 48, discs 43, 47 and abutment ring 21 constitute the spring and brake disc sub-assembly previously referred to. The torque transmitting rollers 38 and the ramps 36 on the opposed flanges of the power input and output members 11, 30 constitute the roller and ramp sub-assembly of the unit 10.

A spring-restraining and loading ring 51 of L-shaped cross-section surrounds the recessed portion 49 of output member 30, receiving this portion for some degree of axial sliding movement of the output member. This ring serves as an external limiting abutment for the Belleville springs 50, and is provided with a small shoulder 52 on its inner peripheral edge for the purpose of preventing possible reverse snap-over of the springs under heavy axial loading.

Ring 52 mounts on its exterior the inner race 53 of a ball bearing 54, the outer race 55 of which is piloted for sliding adjustment action within the brake drum 17.

An annular restraining and brake pressure adjusting nut 56 is threaded into the end of drum 17; and it will be appreciated that, as seen in FIG. 1, a rotative adjustment of the ring 56 will vary the compressive force exerted on Belleville springs 50 in the operation of unit 10, thereby adjusting the force exerted by the springs on the clutch disc pack 43, 47. This determines the value of the excess of aiding load torque which will result in the locking of the output member 30 to the fixed brake drum 17.

Like power input member 11, the output member 30 is shown as being provided with a hexagon-shaped bore 57 to receive an appropriate driven member (not shown), although it is obvious that any other kind of drive connection for such output member may be employed.

It will be observed that the cylindrical body portion 44 of the power output member 30 presents a circumferential, radially outwardly extending axial shoulder 58 which, when power is being normally transmitted, engages and urges the Belleville springs 50 to the left. Depending upon the driving thrust exerted through the roller and ramp sub-assembly, this shift of the springs may continue until they bottom against the small ring shoulder 52. In any event, drive is direct, in one direction or the other, from input member 11 through the roller and ramp structure to output member 30.

In operation, and reference being first had to FIG. 1A of the drawings showing parts of brake unit 10 in their normal driving and brake released condition, the shoulder 58 of output member 30 has engaged the adjacent spring 50 to take the pressure off of and release the set of brake discs 43, 47. This happens because of the fact that, as the power input member 11 is rotatively driven in one direction or the other, its wedge ramps 36 coact with those of the power output member 30 in causing the ramp or wedge rollers 38 to roll up the ramp surfaces 37 in one circumferential direction or the other, as previously described. Since the power input member 11 is axially restrained from the right (FIG. 1) the result is that the output member 30 is urged to the left. The desirable variable axial thrust action of the rollers and ramps due to the design of ramp surfaces 37, 39 (FIG. 3) has been mentioned.

In the minimum, neutral spacing of the input and output member flanges 26, 32, from one another in the axial direction, the shoulder 58 of the output member 30 is spaced from the adjacent Belleville spring 50 an axial distance "*a*" of approximately 0.010–0.015 inch; and when this axial lost motion is taken up upon shift of member 30 to the left the Belleville springs are engaged and compressed axially to their relative position of FIG. 1A, shown as under full compression. This relieves the brake disc pressure ring 48 and the disc pack of all braking pressure and puts the unit 10 in its normal operating and torque transmitting condition of FIG. 1A to drive the output member 30.

However, when a reverse and excessive aiding load torque develops at any device (not shown) driven at 57 by output member 30, this member is rotated reversely relative to the input member 11 in one direction or another (depending upon the rotative direction character of the input). This causes the torque transmitting rollers 38 to roll back down on the surfaces 37 of wedge ramps 36, in a circumferential direction toward or to the middle ramp bottom zone 39, permitting output member flange 32 to approach input member flange 26. The corresponding approach movement of power output member 30 is to the right (FIGS. 1 and 1A), and the result is that the Belleville springs 50 engage brake pressure ring 48 to compress brake discs 43, 47, thus locking output member 30 to the fixed drum 17 of the brake unit 10, and halting the objectionable load overrun.

Braking takes place in the fashion characteristic of a clutch or brake disc pack, i.e., in a manner to absorb and dissipate frictional energy in a relatively gradual manner, distributing the braking force over a relatively large disc area and without the high unit pressure which, as suddenly applied, would tend to cause other types of limited surface braking element to overheat locally.

FIG. 5 of the drawings illustrates a modified, unidirectional drive adaptation of the invention, in which many parts and features of parts are very similar or identical to parts involved in the embodiment of FIGS. 1 through 4. Accordingly, corresponding reference numerals, primed, are employed in FIG. 5 to designate such corresponding parts or features, and further detailed description thereof will be dispensed with. The modified embodiment differs primarily from that earlier described in that it employs sprag components as an intermediate agency for the application of braking effort from the brake disc pack to a fixed brake drum.

In this unidirectional embodiment of the brake unit, generally designated 60, the brake discs 43' have keyed, rotatively fixed engagement of their key lugs 42' in one or more radially inwardly opening key recesses 61 of an axially extending formation 62. This formation or extension is integral with an offset cylindrical inner race flange 63 on an intermediate ring member 64, which is piloted within the inner circumferential cylindrical surface 65 of the fixed brake ground member or drum, here designated 66. The race flange 63 extends axially in surrounding relation to a brake disc abutment ring 67 surrounding the body portion 44' of power output member 30'.

In order to insure that the ring 67 rotates with the output member 30', a special brake or clutch disc **43*a* keyed to the latter is provided, the disc 43*a* frictionally engaging the ring 67 and both of these parts having running clearance relative to flanged ring 64**.

The flange 63 of ring 64 presents an outer cylindrical race surface 68.

An annular series of conventionally shaped sprags 69 is disposed between the race surfaces 65, 68 of the drum 66 and flange 63, respectively; and, in a conventional manner, a coiled annular garter spring 70 acts in circumferentially aligned recesses 71 at one axial side of the sprags 69, the spring 70 tilting sprags 69 in a direction to wedgingly engage opposed wedging or cam surfaces of the sprags with the respective race surfaces 65 and 68.

It will be noted that only a single ramp roller member 70 is employed, in the form of an elongated cylindrical pin or rod extending diametrically across the interior of power input member 11' and into only two pairs of opposed ramp recesses 36' on diametrically opposite sides of that member. However, the action is the same as in the first form.

The operation of the embodiment of FIG. 5 is in the main similar to that of FIGS. 1–4, hence need not be described in great detail. The normal driving torque of member 11' causes the power transmitting ramp roller rod 70 to ride up on the opposing ramp surfaces of that member and the power output member 30' in transmitting the torque, and the result is that the Belleville springs 50' are shifted by shoulder 58' in a direction to free the clutch pack 43', 47' from a condition locking output member 30' to the extension 62 of the ring member 64 carrying the sprag race flange 63. The ring 64 is in this condition not locked to drum 66 by the sprags 69, and the latter may slide relative to the race surface 65 of the drum.

Upon the arising of the critical reverse and excessive aiding torque at an output member (not shown) connected to the member 30', a reverse rotative shift of the latter takes place relative to power input member 11', causing member 30' to approach member 11' and the Belleville springs 50' to engage pressure ring 48' and compress the brake disc pack, thereby locking the output member 30' to the flanged race carrying member 64. The resultant corresponding rotative shift of member 64 causes its race surface 68 to try to move correspondingly relative to the drum race surface 65; and this wedges the set of sprags 69 between the surfaces 65, 68 to effect a positively locked connection of ring member 64 to drum 66. When the condition of excessive output load passes, the parts are freed from braked condition in the manner described in connection with the embodiment of FIGS. 1–4.

FIG. 6 of the drawings shows a typical performance curve 74 of the embodiment of the invention in a bi-directional releasable load brake unit such as is designated 10 in FIGS. 1–4. The curve is typical for both directions of input torque rotation since the construction of the unit 10 is symmetrical internally in respect to rotational motion in both directions.

Input torque is plotted vertically against output torque plotted horizontally. For a stable condition, input torque must always remain "positive," that is, a condition requiring net driving input effort. The "negative" input torque range is a runaway condition in which a retarding torque must be applied. This condition is not desirable, and is prevented by the bi-directional load brake unit. Output torque may be aiding or assisting while in motion, opposing or resisting while in motion, or holding while static, i.e., in the neueral braked condition of FIGS. 1 and 3.

Opposing or resisting torque loads are represented on the right-hand portion of the curve, with the design torque value of opposing load arbitrarily selected and made equal to 100%. On this basis it requires 110% to 130% of input torque typically to drive a 100% resistive output load, as indicated at 75.

Aiding or assisting torque loads are represented on the left-hand portion of the curve, and for up to 55% of the rated output load, typically 40%–50% of the rated input torque is required to drive, as indicated at 76. The torque required to drive the output with no load applied, is also typically 40% to 50% of rated load. Static or "holding" torque load is supported in both directions at the output.

The useful working range of the unit 10 is shown at 77, and a 100% efficiency line is designated 78.

It will be appreciated that the shape and proportions of the curve 74 can be varied by internal geometry and Belleville spring load selected for the unit 10. The geometry is predetermined, but the Belleville spring load may be changed at will by adjustment of the nut 56 (FIG. 1) to suit the application. It is typical procedure to set the output slip torque setting at twice the expected maximum opposing load torque. It is also typical for the aiding load to be considerably less than the opposing load torque in a given application, because friction within the system adds to the opposing load but reduces the aiding load. The ratio of 100% opposing load to 55% aiding load is a typical situation, therefore, met in practice.

The braking unit 10 will also arrest output inertia loads by allowing slight slippage when the input motion is stopped.

In the embodiments of FIGS. 1 through 4 and FIG. 5, the output member 30 or 30' shifts axially away from and toward the input member 11 or 11' in the operation of the mechanism. FIG. 7 of the drawings shows a further modified embodiment in which these members maintain an axially fixed relationship to one another in all phases of operation of the mechanism, specially designated 80. Inasmuch as many parts of this embodiment are similar to those of the embodiment of FIGS. 1–4, corresponding parts are designated by corresponding reference numerals, double primed, and further description is dispensed with.

In the unit 80, the output member, specially denoted 81, is provided with a longitudinal spline or key 82, by which it is drivingly connected to an axially elongated hub or sleeve 83 of a special output ramp member, generally designated 84. This member carries an external key formation or formations 85, similar to the external key means of the output members 30 or 30' of the first two embodiments; and the set or pack of brake discs 43″, 47″ is interposed between the ramp output member 84 and the fixed ground or brake drum 17″, as in those embodiments.

The tubular ramp member 84 carries an integral, radially outwardly extending annular flange 86 which has ramp formations 87, of the type shown in FIG. 4, receiving the ramp roller elements 38″ for coaction with ramp formations 36″ on the input member 11″.

It is seen that, in so far as performance is concerned, the embodiment of FIG. 7 is substantially the same as in the case of the embodiment of FIGS. 1–4, the only material difference being a structural one, in that the axially slidable rotative, keyed or splined connection of the special ramp member 84 permits its axial movement relative to the input and output members 11″, 82, these basic members being axially fixed relative to one another.

It is seen that the invention affords a braking type of torque transmitting unit which, in either of its bi.directional and unidirectional embodiments, is relatively simple yet rugged in construction, affording a relatively wide versatility and adaptability in action in driving an opposing load and braking an excessive aiding load. Braking is accomplished rapidly, yet in a desirable, shock-free energy dissipative manner.

The invention also provides a specific improvement in the contouring of the opposing ramp formations 36, affording the mildly curved central zone 39 on an arc greater than the radius of the ramp rollers, thereby providing for a high thrust force at relatively high mechanical advantage, as the unit starts into operation from the neutral or idle and locked condition of its parts depicted in FIGS. 1 and 3.

Of course, although the rolling ramp members are herein illustrated in the form of cylindrical, relatively short rollers 38 in the first embodiment, and a relatively elongated cylindrical rod 70 in the second embodiment, it will be appreciated that the rolling ramp members might well be balls appropriately guided for action in ramp formations of the general type shown in FIG. 3; and accordingly the use in the claims of the term "roller" means is to be broadly construed to cover such equivalent ball component.

What I claim as my invention is:

1. A torque transmitting mechanism having coaxial power input and output members, and means to prevent or limit rotative overrun of the loaded output member of the mechanism in the direction of rotation of the input member, comprising roller and ramp type drive means having elements fixedly connected respectively to said input and output members and operable in response to relative rotative shift of said members attending said overrun to cause axial shift of the members in one direction toward one another, said members being shifted away from one another during a power transmitting phase, a fixed brake member, a brake disc set having means to releasably connect the same in operative braking relation between said output and braking members, said connecting means comprising an intermediate member with which said brake disc set has braking engagement, and sprag means disposed between said intermediate and brake members to releasably and wedgingly lock the same to one another, said output member being operatively engageable with said brake disc set upon movement of said output member in said one axial direction to cause said brake set to lock the output member in relation to said fixed brake member during said overrun.

2. A torque transmitting mechanism having coaxial power input and output members, and means to prevent or limit rotative overrun of the loaded output member of the mechanism in the direction of rotation of the input member, comprising drive means having elements fixedly connected respectively to said input and output members and operable in response to relative rotative shift of said members attending said overrun to cause axial shift of the members in one direction toward one another, said members being shifted away from one another during a power transmitting phase, a fixed brake member, a brake device having means to releasably connect the same in operative braking relation between said output and braking members, said connecting means comprising an intermediate member with which said brake device has braking engagement, and sprag means disposed between said intermediate and brake members to releasably and wedgingly lock the same to one another, said output member being operatively engageable with said brake device upon movement of said output member in said one axial direction to cause said brake device to lock the output member in relation to said fixed brake member during said overrun.

References Cited by the Examiner

UNITED STATES PATENTS

| | | | |
|---|---|---|---|
| 1,634,861 | 7/1927 | Weymann | 192—8 |
| 2,659,466 | 11/1953 | Ochtman | 192—8 |
| 2,783,861 | 3/1957 | Jungles | 192—8 |
| 2,925,157 | 2/1960 | Davis | 192—8 |
| 3,068,975 | 12/1962 | Theuer | 192—8 |

FOREIGN PATENTS

| | | |
|---|---|---|
| 125,021 | 4/1959 | Russia. |

DAVID J. WILLIAMOWSKY, *Primary Examiner.*

DON A. WAITE, *Examiner.*

B. W. WYCHE III, *Assistant Examiner.*